United States Patent
Hägeli et al.

[11] Patent Number: 6,134,100
[45] Date of Patent: Oct. 17, 2000

[54] GAS-INSULATED SWITCHGEAR ASSEMBLY HAVING MOUNTING ELEMENTS

[75] Inventors: Heinz Hägeli, Würenlos; Markus Vestner, Büsingen; Martin Zürcher, Watt, all of Switzerland

[73] Assignee: Asea Brown Boveri AG, Baden, Switzerland

[21] Appl. No.: 09/379,363

[22] Filed: Aug. 23, 1999

[30] Foreign Application Priority Data

Aug. 22, 1998 [DE] Germany ............... 198 38 251

[51] Int. Cl.$^7$ ...................................... H02B 5/00
[52] U.S. Cl. ............... 361/605; 361/604; 361/612; 361/618; 248/127; 248/128; 248/146; 248/901; 248/903; 220/581; 220/582; 220/916
[58] Field of Search ................. 361/604, 605, 361/612, 613, 618, 619; 248/128, 127, 901, 903, 146; 220/581

[56] References Cited

U.S. PATENT DOCUMENTS

| | | | |
|---|---|---|---|
| 2,092,165 | 9/1937 | Kepler | 248/146 |
| 3,595,408 | 7/1971 | Eddy et al. | 414/349 |
| 4,032,820 | 6/1977 | Oishi et al. | 361/612 |
| 4,527,761 | 7/1985 | Nassauer | 248/128 |
| 5,190,260 | 3/1993 | Daubenspeck | 248/313 |

FOREIGN PATENT DOCUMENTS

| | | |
|---|---|---|
| 19511168A1 | 10/1996 | Germany . |
| 19716023A1 | 10/1998 | Germany . |

OTHER PUBLICATIONS

Dubbel Teschenbuch fur denn Maschinenbau, Beit, et al., Sep. 1981, p. 716. "Sprecher Energie", brochure, 1986.

*Primary Examiner*—Leo P. Picard
*Assistant Examiner*—Boris L. Chervinsky
*Attorney, Agent, or Firm*—Burns, Doane, Swecker & Mathis, L.L.P.

[57] ABSTRACT

The encapsulation (1) of a gas-insulated switchgear assembly is supported at both ends (7, 9) on a foundation (11). To this end, mounting device (12) are provided at the first end (7) and are anchored in the foundation (11) such that they cannot move. At the second end (9), the mounting device (13) are designed such that they can move with respect to the foundation (11), in the longitudinal direction of the encapsulation (1). This avoids mechanical stresses in the assembly. A force absorbing member is also provided at the first end (7), which transmits horizontal forces from the encapsulation (1) to the foundation (11), and thus relieves the load on the mounting device (12, 13).

13 Claims, 3 Drawing Sheets

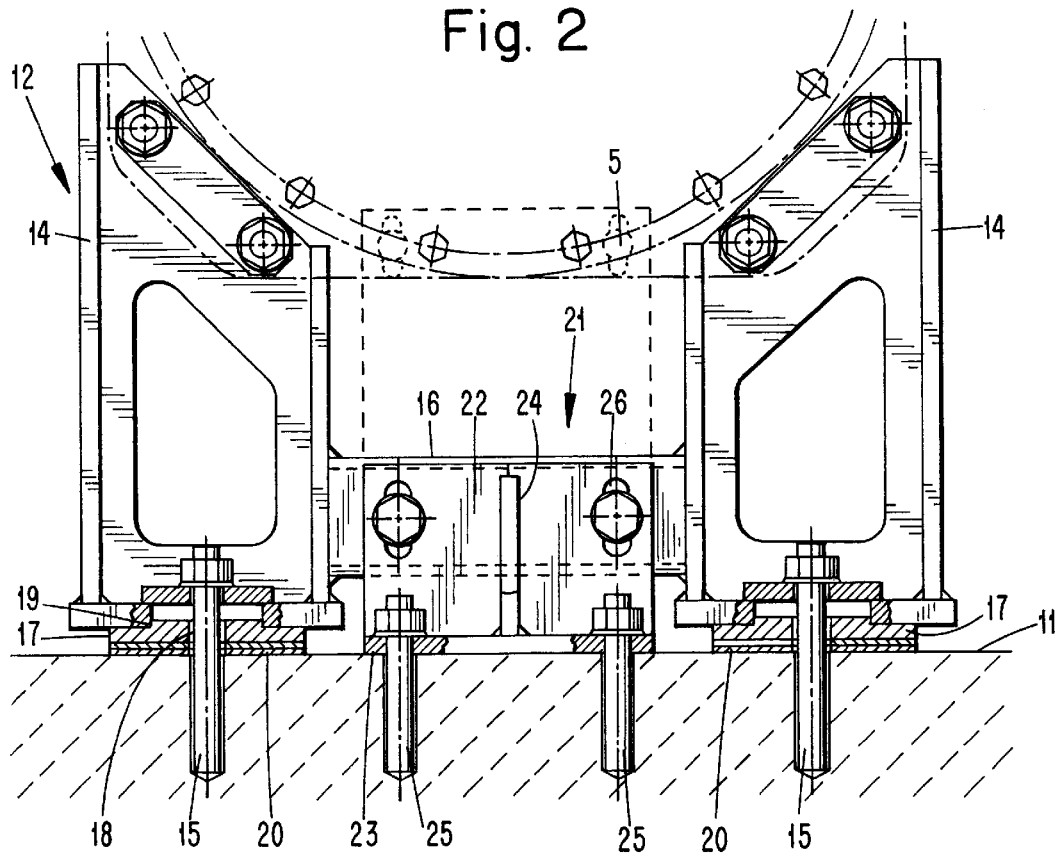
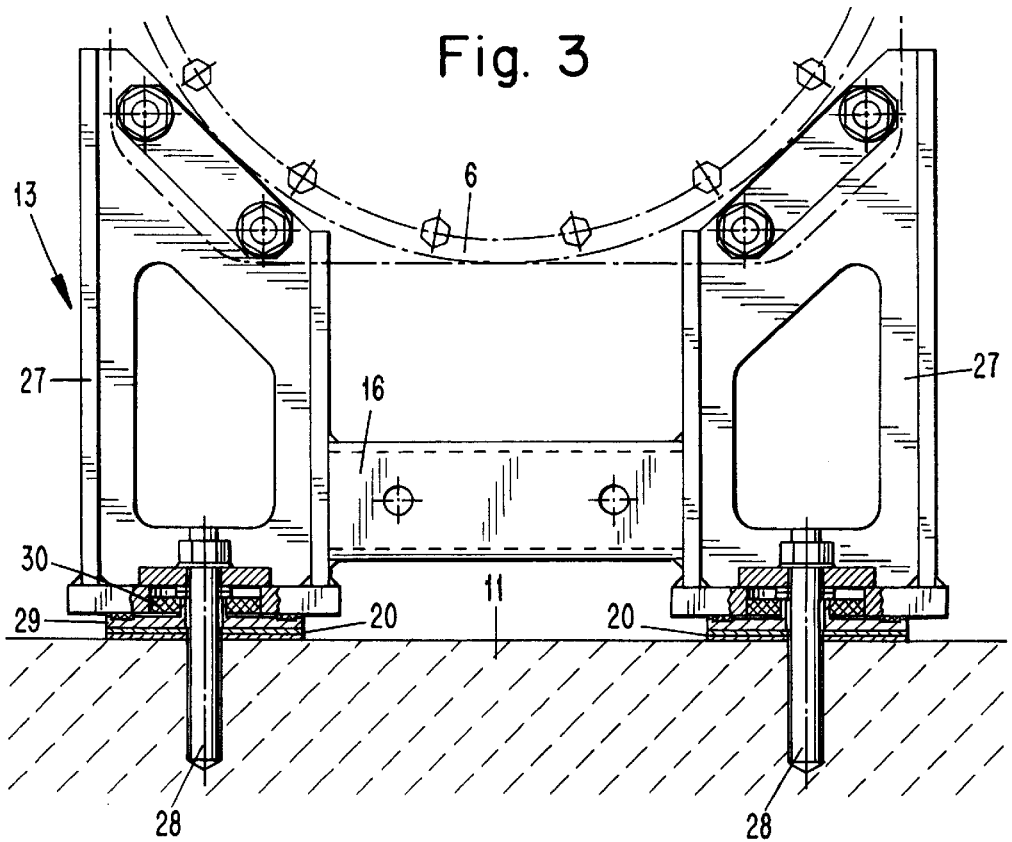

GAS-INSULATED SWITCHGEAR ASSEMBLY HAVING MOUNTING ELEMENTS

BACKGROUND OF THE INVENTION

1. Field of the Invention

The invention relates to a gas-insulated switchgear assembly.

2. Discussion of Background

Gas-insulated switchgear assemblies of this type are used as power breakers for high voltages. They have encapsulation in order to accommodate switching members. The encapsulation is gastight and is filled with an inert gas at a defined pressure. As a rule, the encapsulation is arranged on a base, for example a foundation. The encapsulation must be mounted on the foundation in a highly robust manner in order to absorb the forces that occur.

SUMMARY OF THE INVENTION

Accordingly, an object of the invention is to provide a novel switchgear assembly of the type mentioned initially with a mounting whose design is as simple as possible and which can nevertheless withstand the forces which occur.

According to the invention, the encapsulation is thus held at both ends by mounting means, in which case, however, one end of the encapsulation can move with respect to the foundation, in the longitudinal direction of the encapsulation. This therefore avoids any stresses occurring as a result of different temperatures in the encapsulation and foundation.

A first end of the encapsulation is preferably firmly connected to the foundation, while the second end can move in the longitudinal direction.

The mounting means at the movable end of the encapsulation may be connected to the foundation, for example, via a retaining member in the form of a rod, for example a bolt, with this retaining member extending through a slot or an elongated hole in the mounting means.

A separate force absorbing member is preferably provided at one end of the encapsulation, in order to absorb longitudinal and lateral forces. This allows the retaining members to be optimized to absorb forces in the vertical direction, while longitudinal and transverse forces (for example when the power breaker is operated or in the event of earthquakes) to be absorbed by the force absorbing member.

In order to simplify installation, the force absorbing member may have height-tolerant connecting means for connection to the mounting means and/or to the encapsulation. This allows the encapsulation first of all to be leveled on the mounting means, and for the force absorbing member then to be fitted without having to match the height. To this end, the force absorbing member, the mounting means or the encapsulation can be provided with suitably running slots or longitudinal holes, in order to hold the connecting bolts.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows a view of the switchgear assembly from FIG. 1, in the direction II, FIG. 3 shows a view of the switchgear assembly from FIG. 1, in the direction III.

DESCRIPTION OF THE PREFERRED EMBODIMENTS

Figure 1:
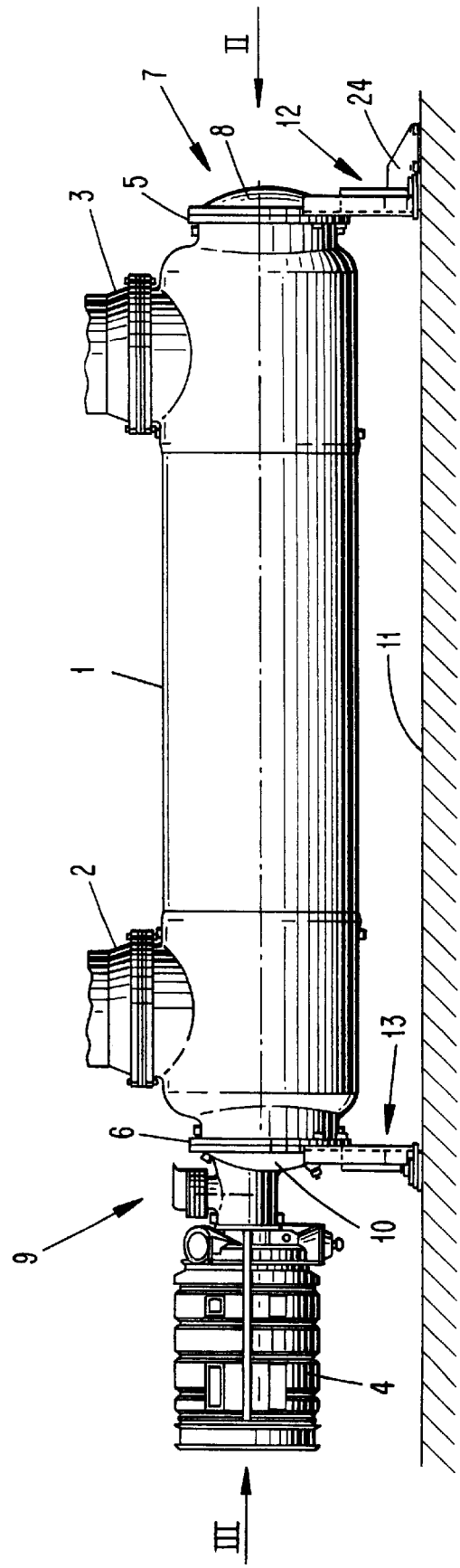
FIG. 1 shows a side view of one version of a switchgear assembly according to the invention.

Referring now to the drawings, wherein like reference numerals designate identical or corresponding parts throughout the several views, FIG. 1 shows a gas-insulated switchgear assembly, as is used as a power breaker for high voltages. It has essentially cylindrical metal encapsulation 1, which encloses the actual switching members. The encapsulation is filled with inert gas at a predetermined pressure. The current path to be switched extends through connections 2 and 3. A drive 4 to operate the switching elements is provided at one end of the encapsulation 1.

The encapsulation 1 ends in a flange 5, 6 at each of its two ends. At a first end 7 of the encapsulation, the cover 8 is bolted to the flange 5, and a connecting element 10 for the drive 4 is screwed on a second end 9.

A foundation 11 is used as a base for the switchgear assembly. First and second mounting means 12, 13 support ends 7 and 8, respectively, on the foundation 11.

FIG. 2 shows the design of the first mounting means 12, showing the first end 7 of the switchgear assembly. Two supports 14 are firmly bolted to the flange 5 and are anchored by means of two anchor bolts 15 in the foundation 11 such that they cannot move. For stabilization and in order to simplify installation, a web 16 extends between the supports 14. Horizontal movement of the supports 14 is prevented by centering disks 17, which have a central round hole 18 to accommodate the anchor bolts 15, and a concentric shoulder 19 to hold the supports 14. Gaskets 20 between the centering disks 17 and the foundation 11 are used to compensate for height differences.

In addition, a force absorbing member 21 is provided, which is used to transmit horizontal forces, that is to say longitudinal and lateral forces, from the encapsulation 1 to the foundation 11. This force absorbing member 21 comprises a metal bracket with a vertical limb 22, a horizontal baseplate 23 and a reinforcing web 24, and is anchored in the foundation 11 via anchor bolts 25. Vertically running elongated holes 26 are provided in the limb 22, and mounting bolts extend through them. The mounting bolts form a connection between the force absorbing member 21 and the web 16. The elongated holes 26 make the connection between the force absorbing member 21 and the web 16 height-tolerant, that is to say the number and thickness of the gaskets 20 can be matched to the evenness of the foundation 11, without any changes being required to the force absorbing member.

The force absorbing member 21 relieves the load on the supports of both ends 7, 9 of the switchgear assembly, and absorbs the horizontal forces which occur. This allows the supports and their anchors to be optimized to absorb vertical forces.

The force absorbing member 21 can also be directly connected to the flange 5 of the encapsulation 1, illustrated in phantom in FIG. 2.

FIG. 3 shows the design of the second mounting means 13, showing the second end 9 of the switchgear assembly. Two supports 27 are firmly bolted to the flange 6, and are anchored in the foundation 11 by means of two anchor bolts 28. A web 16 once again extends between the supports 27, and gaskets 20 are used for leveling the switchgear assembly.

In contrast to the supports 14 and the first end 7, the supports 27 of the second end 9 are moved in the longitudinal direction of the encapsulation 1 with respect to the foundation 11. To this end, sliding disks 29 and guide disks 30 are used instead of the centering disks 17.

Figure 4:
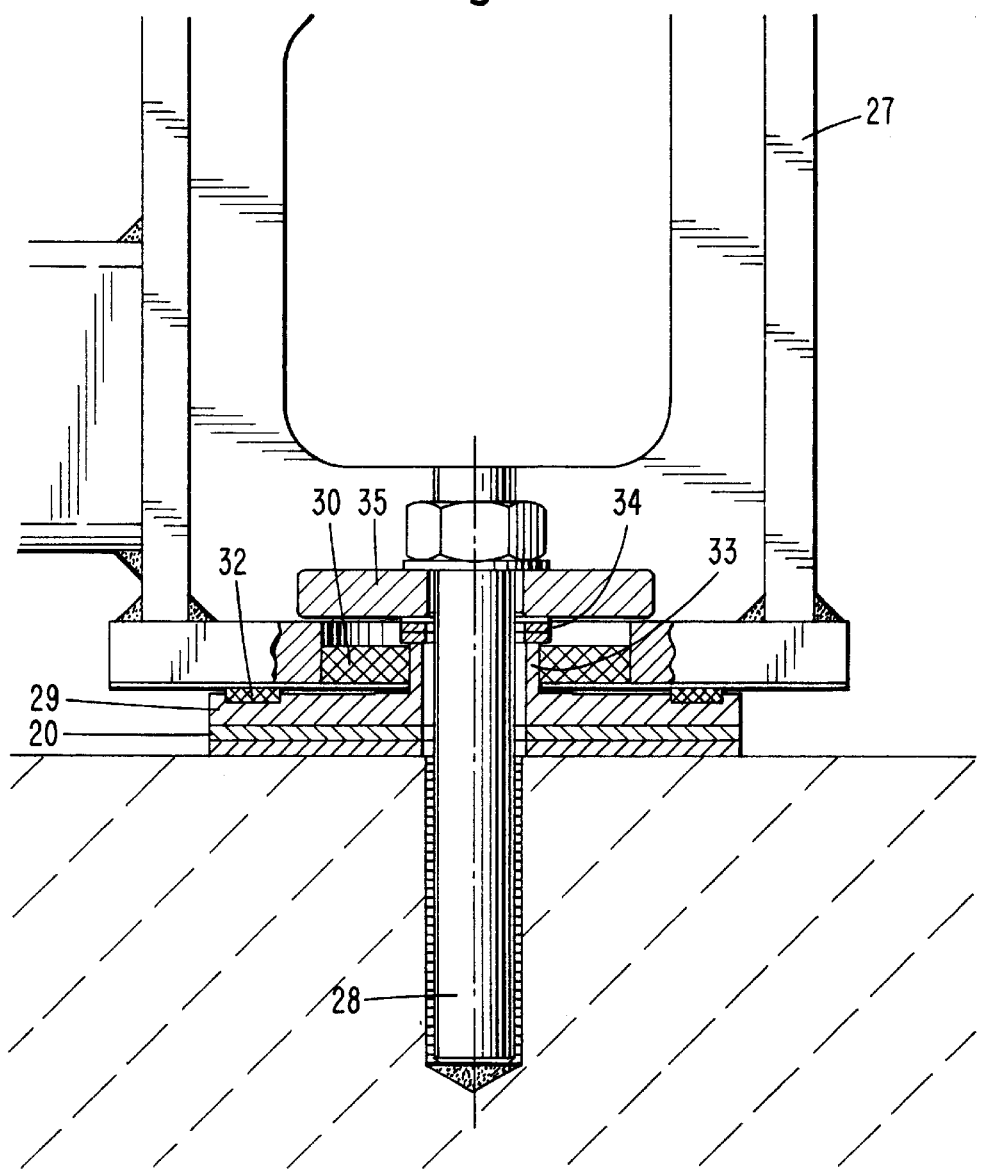
FIG. 4 shows a detail section through a movable support.
Figure 5:
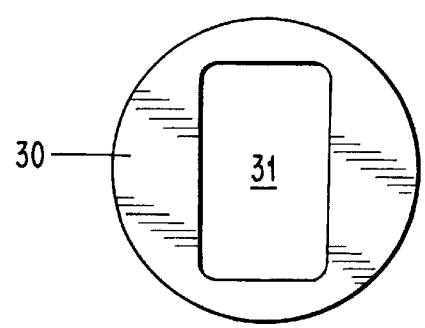
FIG. 5 shows a guide disk for the support shown in FIG. 4.

FIG. 4 shows an enlargement of the corresponding design, and FIG. 5 shows a single guide disk 30. The guide disks 30 are fitted into the feet of the supports 27, and each have an elongated hole 31 for the anchor bolts 28. The guide disks 30 are aligned so that the elongated holes 31 extend in the longitudinal direction of the encapsulation 1.

A sliding ring 32 is fitted on the upper face of the sliding disks 29 and forms a sliding bearing for the supports 27. Furthermore, they have a neck 33 which, via gaskets 34, 35, supports the head or the nut of the anchoring bolts 28, so that the feet of the supports 27 are not crushed when the bolts are tightened.

The configuration of the anchorage allows the supports 27, and thus the encapsulation end 9, to move in the longitudinal direction of the encapsulation with respect to the foundation 11. This avoids stresses when the encapsulation contracts or expands with respect to the foundation, for example owing to different temperature effects.

Obviously, numerous modifications and variations of the present invention are possible in the light of the above teachings. It is therefore to be understood that, within the scope of the appended claims, the invention may be practiced otherwise than as specifically described herein.

What is claimed as new and desired to be secured by Letters Patent of the United States is:

1. A gas-insulated switchgear assembly comprising encapsulation for accommodating switching members, first mounting means for mounting a first end of the encapsulation on a foundation, and second mounting means for mounting a second end of the encapsulation on the foundation, wherein the second mounting means are movable in such a manner that the second end of the encapsulation can be moved with respect to the foundation in a longitudinal direction of the encapsulation.

2. The switchgear assembly as claimed in claim 1, wherein the first mounting means, and thus the first end of the encapsulation, are firmly connected to the foundation.

3. The switchgear assembly as claimed in claim 1, wherein said switchgear assembly has a drive for the switching elements arranged at the second end of the encapsulation.

4. The switchgear assembly as claimed in claim 1, wherein the second mounting means are held by at least one retaining member which is in the form of a rod and is connected to the foundation, the retaining member extending through an elongated hole in the mounting means.

5. The switchgear assembly as claimed in claim 1, further comprising a force absorbing member connected to the foundation in the region of the first end of the encapsulation to absorb longitudinal and lateral forces.

6. The switchgear assembly as claimed in claim 5, wherein the force absorbing member has height-tolerant connecting means for connection to the first mounting means.

7. The switchgear assembly as claimed in claim 6, wherein the force absorbing member has at least one vertically extending elongated hole for holding at least one connecting bolt for the force absorbing member.

8. The switchgear assembly as claimed in claim 5, wherein the force absorbing member is a bracket having a base for mounting on the foundation and a limb mounted on the first mounting means.

9. The switchgear assembly as claimed in claim 1, wherein the encapsulation includes two end flanges, and wherein at least one of the first mounting means and the second mounting means has two supports which are mounted on one of the two end flanges.

10. The switchgear assembly as claimed in claim 9, further comprising a web, and wherein the two supports are connected via the web.

11. The switchgear assembly as claimed in claim 5, wherein the force absorbing member has height-tolerant connecting means for connection to the encapsulation.

12. The switchgear assembly as claimed in claim 6, wherein the first mounting means has at least one vertically extending elongated hole for holding at least one connecting bolt for the force absorbing member.

13. The switchgear assembly as claimed in claim 5, wherein the force absorbing member is a bracket having a base for mounting on the foundation and a limb mounted on the encapsulation.

* * * * *